(12) United States Patent
Rodriguez

(10) Patent No.: US 6,440,544 B1
(45) Date of Patent: Aug. 27, 2002

(54) PAPERBAND

(75) Inventor: Peter A. Rodriguez, Jacksonville, FL (US)

(73) Assignee: Sandar Industries, Inc., Atlantic Beach, FL (US)

( * ) Notice: Subject to any disclaimer, the term of this patent is extended or adjusted under 35 U.S.C. 154(b) by 0 days.

(21) Appl. No.: 09/421,703

(22) Filed: Oct. 20, 1999

(51) Int. Cl.$^7$ .................................................. B32B 7/00
(52) U.S. Cl. ............................ 428/212; 428/78; 428/88; 428/89; 428/92; 428/97; 428/119; 428/195; 428/209; 428/211; 428/220

(56) References Cited

U.S. PATENT DOCUMENTS

| | | | | |
|---|---|---|---|---|
| 5,262,214 A | * | 11/1993 | Instance | 42/40 |
| 5,399,403 A | * | 3/1995 | Instance | 428/40 |
| 5,597,654 A | * | 1/1997 | Scholz | 428/514 |
| 5,756,175 A | * | 5/1998 | Washburn | 428/42.3 |

* cited by examiner

*Primary Examiner*—Cynthia H. Kelly
*Assistant Examiner*—Ling Xu
(74) *Attorney, Agent, or Firm*—Arthur G. Yeager

(57) ABSTRACT

An improved paper band includes an upper and lower elongate planar covering member and an elongate core member sandwiched in between the covering members. The core member is narrower in width than the coverings and has generally vertically disposed sidewalls extending lengthwise. The outer edge portions of the coverings extend outwardly beyond the sidewalls of the core member. The core is glued to at least one covering member. The outer edges of the covering members are also glued together. Preferably, all members are formed of repulpable fibers or biodegradable materials and are attached with water soluble, biodegradable adhesive. Alternatively core members can be formed of various synthetic materials or metal for greater strength if necessary.

20 Claims, 2 Drawing Sheets

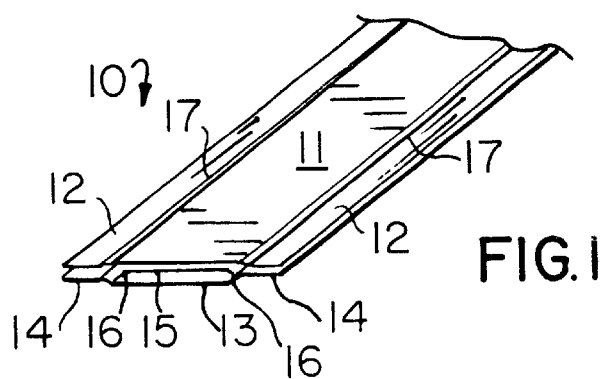
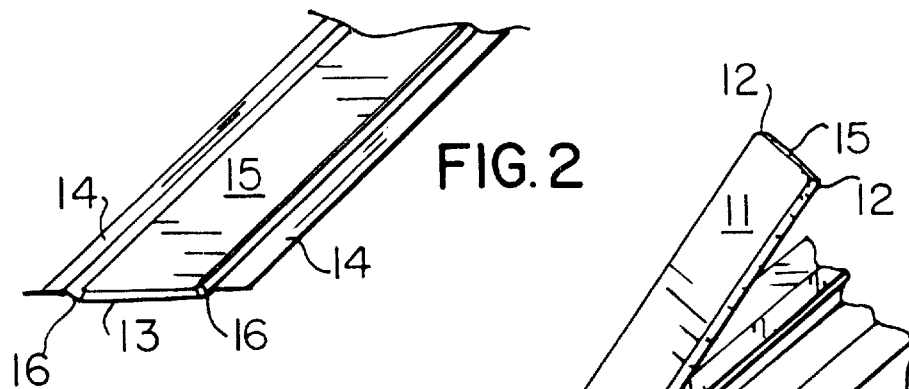
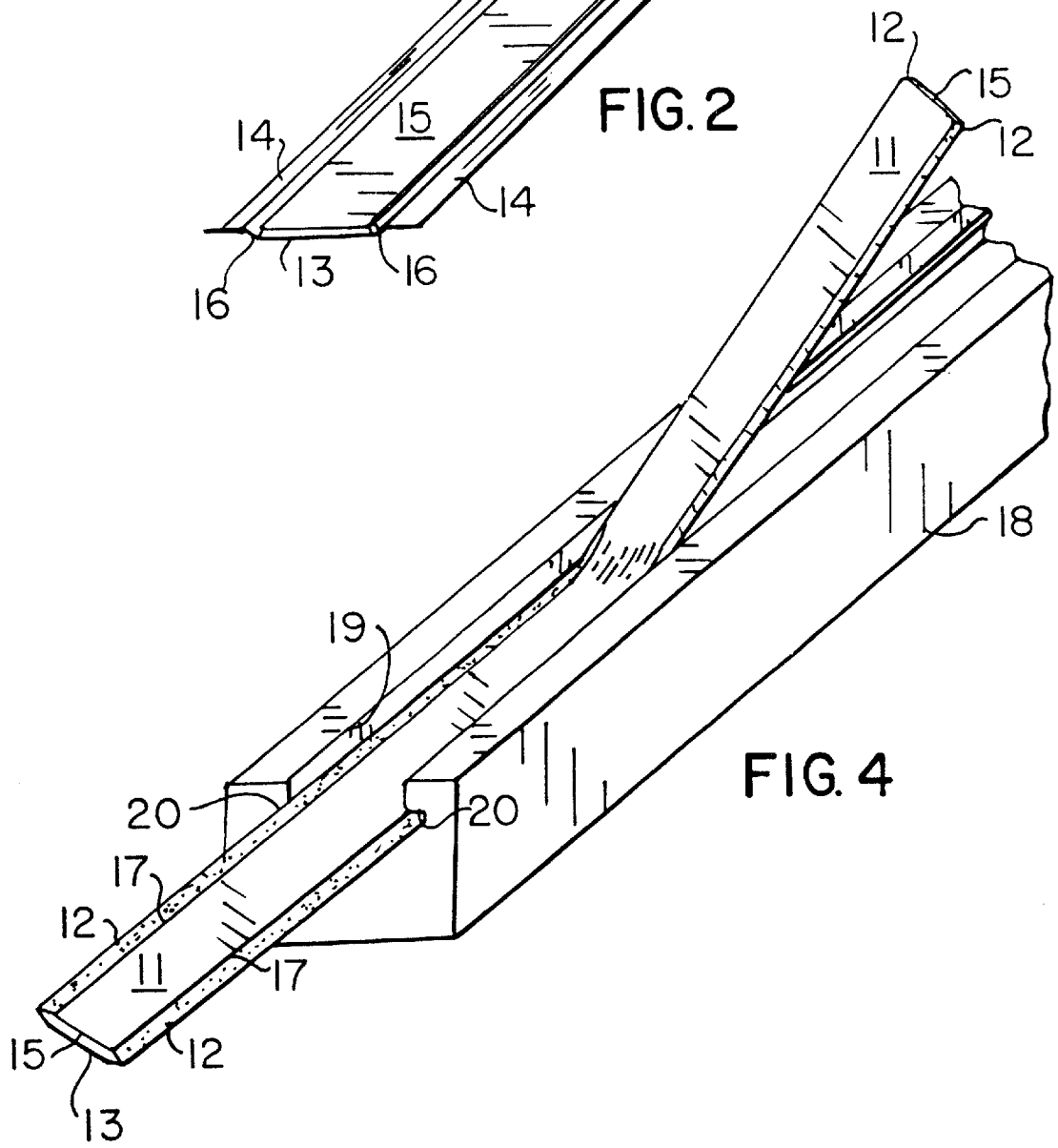

PAPERBAND

BACKGROUND OF THE INVENTION

1. Field of the Invention

The present invention relates to an improved paperband used in turn up systems in the papermaking industry and for banding in the packaging industry and particularly to paperbands that are carried by and removed from a channel in a track assembly.

2. Related Art

It is common practice in the papermaking and packaging industries to employ a paperband or strap that is loaded into the channel of a track assembly and then removed rapidly upwardly and out of the channel and employed to cut and spool a web of paper or to be used to wrap around and secure a bundle of material. Because the paperband must be stiff enough to be pushed into the channel from one end thereof, the band may twist or otherwise be distorted during upward movement that is accomplished by a "stripping" action during removal from the paperband carrier. This becomes a very important consideration in those applications where the width of the channel upward opening is mad& less than the width of the tape and the lower tape-carrying portion of the channel in order to cover and carry the tape. An improved paperband tape is disclosed herein that greatly reduces the distortion and crimping common to prior art paperbands and also reduces the separation of layers in bands made from multiple layers and yarns formed side-by-side.

BRIEF SUMMARY OF THE INVENTION

In one aspect of the present invention there is provided an improved paperband comprising a lower elongate planar covering member having elongate outer edge portions and top and bottom surfaces, an elongate planar core member having top and bottom surfaces and opposite parallel sidewalls disposed generally vertically between the top and bottom surfaces of the core member, and an upper elongate planar covering member having elongate outer edge portions and top and bottom surfaces. Attaching means is provided for securing the core member sandwiched between the top surface of the lower covering member and the bottom surface of the upper covering member and attached to at least one covering member. The respective outer edge portions of the lower and upper covering members extend laterally outwardly of the sidewalls of the core member and the outer edge portions are bendable upwardly and downwardly.

Other aspects of the invention include water soluble biodegradable adhesive means for bonding the top surfaces of the outer edge portions of the lower covering member to the bottom, surfaces of the outer edge portions of the upper covering member.

The attaching means includes adhesive means for bonding the core member to the upper surface of the lower covering member and, to the bottom surface of the upper covering member. The attaching means also includes adhesive means for bonding the core member and the covering members together with the adhesive means covering substantially the entire top surface of the lower covering member and the bottom surface of the lower covering member and the core member.

The outer edge portions of the upper covering member extend outwardly and generally vertically downwardly adjacent the sidewalls of the core member to reinforce the paperband when the outer edge portions are bent upwardly or downwardly. The core member is formed to be a relatively stiff member and the outer edge portions of the covering members are thin and pliable to be easily turned downwardly. The core member may be formed of paper, metal, plastic/acetate or synthetic/textile material.

In another aspect of the present invention there is provided an improved paperband comprising a first elongate planar member having elongate outer edge portions and top and bottom surfaces, a second elongate planar member having top and bottom surfaces and opposite parallel sidewalls disposed generally vertically between the top and bottom surfaces of the second member, the second member being narrower in width than the first member and attaching means for securing the second member longitudinally and medially to the top surface of the first member, the outer edge portions of the first member extends laterally outwardly of the sidewalls of the second member and the outer edge portions are bendable downwardly. The attaching means includes adhesive means for bonding the second member to the upper surface of the first member. The second member is formed to be a relatively stiff member and the outer edge portions of the first member are thin and pliable to be easily turned upwardly or downwardly.

BRIEF DESCRIPTION OF THE SEVERAL VIEWS OF THE DRAWING

The novel features which are believed to be characteristic of this invention are set forth with particularity in the appended claims. The invention itself, however, both as to is organization and method of operation, together with further objects and advantages thereof, may best be understood by reference to thee following description taken in connection with the accompanying drawings, in which:

FIG. 1 is a perspective view of a portion of the improved paperband in accord with the present invention;

FIG. 2 is a perspective view of the paperband of FIG. 1 with the upper layer removed;

FIG. 4 is a perspective of the paperband of FIGS. 1–3 being removed from a paper track assembly.

DETAILED DESCRIPTION OF THE INVENTION

Figure 3:
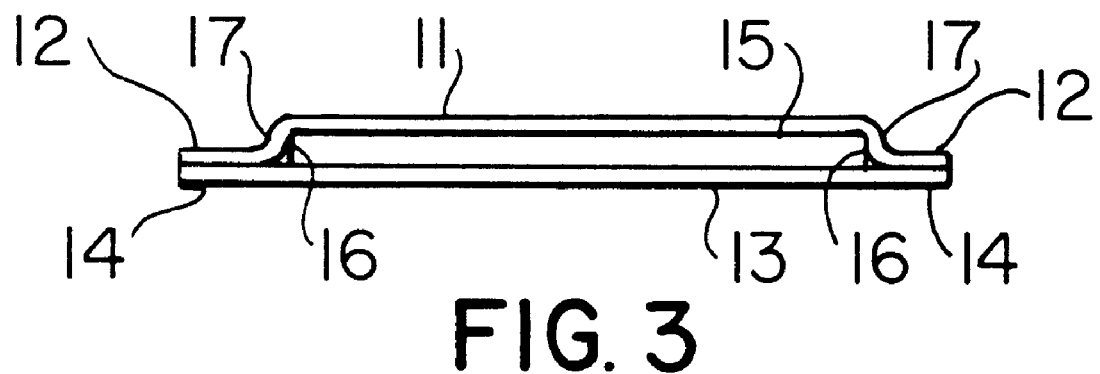
FIG. 3 is a pictorial cross section of the paperband of FIG. 1.

With respect now to the drawing, a pictorial perspective view of a portion of the improved paperband or tape in accord with the present invention is shown at numeral 10 in FIG. 1. In one embodiment the paperband 10 is preferably constructed entirely of repulpable paper formed in an upper layer 11 having two parallel longitudinal edge portions 12 and a lower layer 13 having two parallel longitudinal edge portions 14 attached together preferably with a water soluble glue in a manner to contain an inner core 15. The inner core 15 is narrower in width than layers 11 and 13 and includes an element of generally rectangular cross section (FIG. 3) with vertical sides 16. As shown in FIG. 3, upper layer 11 is formed downwardly over core 15 and against core sides 16 to provide vertically disposed cutting edges 17. Side portions 12, 14 outside of core 15 are thin, pliable members of equal width as clearly shown in FIGS. 1, 2 and 3 and are movable upwardly or downwardly when the paperband 10 is removed from a track assembly 18. The downward movement provides for a reinforcing of the cutting edges 17 as well as a braking action to the band when it exits sideways as will be explained hereinbelow.

Internal core 15 may also be made of stiff paper stock, metal, plastic or synthetic/textile material such as nylon ribbon or webbing of sufficient thickness and stiffness to provide for cutting of the web as well as adequate strength also required in paper bands for securing a package.

With reference to FIG. 4, the paperband 10 is shown being pulled from a conventional track assembly 18 having a channel 19 that is formed to provide two side grooves 20 into which fit the opposite edge portions 12, 14 of the tape 10. As the paperband 10 is pulled upwardly out of the channel 19 from one end thereof to another the side edges 12, 14 are bent downwardly as shown in FIG. 4. This action will provide for reinforcement of the cutting edges 17 of the paperband 10 to minimize distortion and crimping of the center portion of the paperband 10 that houses internal core 15. Because the band can be inserted upwardly or downwardly, the edges 12, 14 can ultimately be bent upwardly or downwardly depending upon the orientation of the band 10.

The paperband 10 shown in FIG. 3 has the upper layer 11 extending downwardly over interior core 15. It is to be understood that layers 11 and 13 could each extend halfway the vertical distance of sides 16 before extending outwardly provided that cutting edges 17 are maintained adequate for the specific application.

Figure 5:
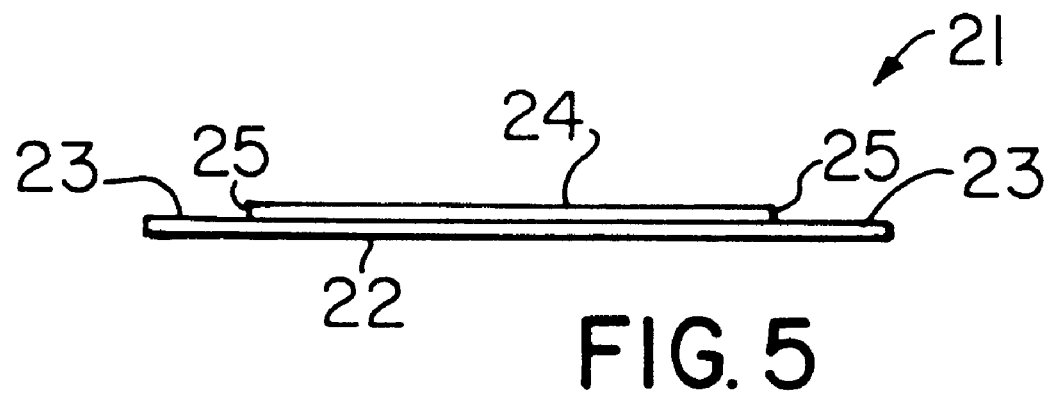
FIG. 5 is an alternative embodiment of the improved paperband showing metal cutting edges.

FIG. 5 illustrates an alternative embodiment of a tape 21 wherein a paper, or alternatively, an acetate, lower layer 22 having outer edge portions 23 of equal width as clearly shown, supports a metal core 24. The cutting edges 25 of the tape 21 are formed by the exposed sides of core 4. This embodiment can be used in cutting fabric or metal foil. When used in banding, the metal core 24 provides for the additional strength, corrosion inhibition, and safety when the band is cut away from a package that may be required in specific applications.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. An improved paperband comprising an elongate planar core member having a central longitudinal axis and including top and bottom surfaces and opposite parallel sidewalls spaced from and parallel to said axis and disposed vertically between said top and bottom surfaces of said core member, an upper and a lower elongate planar covering member each having top and bottom surfaces and thin and pliable elongate outer edge portions extending laterally outwardly of respective said sidewalls of said core member a substantially equal distance to provide for equal width of said outer edge portions spaced from said axis, attaching means for bonding said core member to each said covering member, and disposing said core member sandwiched between said top surface of said lower covering member and said bottom surface of said upper covering member, said respective outer edge portions of said lower and upper covering members extending laterally outwardly of said sidewalls of said core member and being bendable upwardly and downwardly, said core member and upper and lower covering members being of substantially equal length and of substantially equal width throughout their lengths.

2. The paperband as defined in claim 1 wherein said attaching means includes adhesive means for bonding said top surfaces of said outer edge portions of said lower covering member to said bottom surfaces of said outer edge portions of said upper covering member.

3. The paperband as defined in claim 1 wherein said attaching means includes adhesive means for bonding said core member to said upper surface of said lower covering member and to said bottom surface of said upper covering member.

4. The paperband as defined in claim 1 wherein said attaching means includes adhesive means for bonding said core member and said covering members together, said adhesive means covering substantially the entire said top surface of said lower covering member and covering said bottom surface of said upper covering member.

5. The paperband as defined in claim 1 wherein said outer edge portions of said upper covering member extend outwardly and generally vertically downwardly adjacent said side walls of said core member to reinforce said paperband when said outer edge portions are bent upwardly or downwardly.

6. An improved paperband comprising a first elongate planar member having central longitudinal axis and including thin and pliable elongate outer edge portions and top and bottom surfaces, a second elongate planar member having top and bottom surfaces and opposite parallel sidewalls and being disposed substantially centrally along said axis of said first member with its sidewalls parallel to said axis, said second member being narrower in width throughout its continuous length than said first member, and said second member being positioned with its said bottom surface overlying longitudinally and medially said top surface of said first member, attaching means for bonding said lower surface of said second member to said top surface of said first member, said outer edge portions of said first member extending laterally outwardly of said sidewalls of said second member and terminating equidistant from respective said sidewalls of said second member, said outer edge portions being bendable upwardly and downwardly, said first and second members being of substantially equal length along said axis.

7. The paperband as defined in claim 6 wherein said attaching means includes adhesive means for bonding said second member to said upper surface of said first member.

8. The paperband as defined in claim 6 wherein said second member is formed to be generally stiff.

9. The paperband as defined in claim 8 wherein said core member is formed to be a generally stiff element.

10. The paperband as defined in claim 9 wherein said core member is formed of paper.

11. The paperband as defined in claim 9 wherein said core member is formed of metal.

12. The paperband as defined in claim 9 wherein said core member is formed of synthetic material.

13. The paperband as defined in claim 8 wherein said core member is formed of paper.

14. The paperband as defined in claim 8 wherein said core member is formed of metal.

15. An improved paperband comprising thin and pliable upper and lower elongate planar covering members of substantially equal width and each having elongate outer edge portions extending parallel to a central longitudinal axis and each having top and bottom surfaces, an elongate planar stiff core member having top and bottom surfaces and opposite parallel sidewalls disposed vertically between said top and bottom surfaces of said core member, said core member having a width less than the width of said covering members, adhesive means for bonding said core member to each said covering member and disposing said core member sandwiched between said top surface of said lower covering member and said bottom surface of said upper covering member, said respective outer edge portions of said lower and upper covering members extending laterally outwardly of each of said sidewalls of said core member and terminating equidistant from respective said sidewalls of said core member, said outer edge portions being bendable upwardly or downwardly, said covering members and said core member being of substantially equal length along said axis.

16. The paperband as defined in claim 15 wherein said core member is formed of paper.

17. The paperband as defined in claim 15 wherein said core member is formed of metal.

18. The paperband as defined in claim 15 wherein said core member is formed of synthetic material.

19. The paperband as defined in claim 15 wherein said adhesive means is a water soluble, biodegradable glue.

20. The paperband as defined in claim 15 wherein said covering member and said core member are each formed of repulpable paper.

* * * * *